United States Patent [19]

Joyce

[11] 4,140,197

[45] Feb. 20, 1979

[54] TROJAN BAR SUSPENSION DEVICE

[76] Inventor: Lloyd E. Joyce, 809 Davis, Garden City, Kans. 67846

[21] Appl. No.: 900,759

[22] Filed: Apr. 27, 1978

[51] Int. Cl.² .............................................. B05B 3/16
[52] U.S. Cl. ................................ 180/70 R; 74/577 S; 74/578; 137/344; 239/212
[58] Field of Search .......................... 180/70 R, 14 R; 280/255; 239/177, 212; 137/344; 74/128, 142, 577 R, 577 S, 578

[56] References Cited

U.S. PATENT DOCUMENTS

| | | |
|---|---|---|
| 3,866,836 | 2/1975 | Dowd ............................ 239/212 X |
| 4,005,731 | 2/1977 | Townsend ........................ 239/177 X |

Primary Examiner—John A. Pekar
Assistant Examiner—Michael Mar
Attorney, Agent, or Firm—Dean, Flickinger & Robertston

[57] ABSTRACT

A mounting bracket is fixed to the frame of a powered vehicle of the type driven by a trojan bar. An extension coil spring extends downwardly from the bracket. Attached to the lower end of the spring is the upper end of a spring tension adjustment chain. The lower end of the chain is attached to a second mounting bracket, which is fixed to the trojan bar. The device partially supports the weight of the trojan bar.

7 Claims, 5 Drawing Figures

TROJAN BAR SUSPENSION DEVICE

This invention relates to powered vehicles of the type driven by a trojan bar.

In a further aspect, this invention relates to improvements in the trojan bar drive mechanism.

More particularly, the invention concerns an elastic suspension system for the trojan bar.

Trojan bar drive mechanisms are well known in the prior art of powered vehicles, such as irrigation machines, which consist of a frame with rotatably mounted wheels, drive means and irrigation means mounted thereon. These devices utilize a variety of power sources, such as water pressure or electricity, for reciprocally driving horizontally mounted trojan bars, which engage lugs attached to the wheels. The trojan bar carries engagement means for contact with the lugs, which are radially spaced on the wheels. Thus, during a power stroke, the trojan bar engagement means drivably contacts a wheel lug and imparts a rotational motion to the wheel, moving the vehicle in relation to the ground. Trojan bars which push the lugs and those which pull the lugs are commonly known. In either form, a return stroke is required to place the trojan bar into position for a subsequent power stroke. During this return stroke, an inclined surface on the engagement means slides along and over the lug to a point at which the drive surface of the engagement means comes into contact with the lug. The trojan bar then reverses direction and a drive stroke is initiated.

Due to the forces imparted to the trojan bar, a massive and heavy bar is utilized. The resulting common problem of trojan bar drive mechanisms is the wear of the inclined, sliding surface, on the trojan bar engagement means and the lugs. As is known by those skilled in the art to which the instant application pertains, the extensive wear of these parts causes substantial inconvenience and requires objectionable maintenance.

A search of the U.S. Patent and Trademark Office records revealed the following patents:

U.S. Pat. No. 2,893,643 Gordon
U.S. Pat. No. 3,606,161 Paul
U.S. Pat. No. 3,866,836 Dowd
U.S. Pat. No. 3,916,942 Townsend
U.S. Pat. No. 3,952,768 Townsend
U.S. Pat. No. 3,943,966 Boone While these references serve to describe the general state of the art, none of the disclosed inventions proposes a solution to the aforesaid problem. Apparently, the wear, incovenience and extensive maintenance are considered to be inherent in the prevailing designs.

It would be highly advantageous, therefore, to rectify the deficiencies of the prior art.

With the following conditions in mind, the invention has in view the following objects:

1. To provide a device which will reduce the wear on the trojan bar engagement means and the lugs.
2. To provide a device which reduces the high degree of friction generated between the trojan bar engagement means and the lugs.
3. To provide a device usable with conventional trojan bar driven powered vehicles.
4. To provide a device which is easily attached to extant vehicles without the use of specialized tools or equipment, or the need of special training or skills.
5. To provide a device for carrying a substantial portion of the weight of the trojan bar.
6. To provide a device having an elastic member for partially carrying said weight.
7. To provide a device, including means for selectively adjusting the weight carrying capacity of the elastic member.
8. To provide a device for extending the service life of the trojan bar engagement means and the lugs.
9. To provide a device for decreasing the maintenance of the above-noted vehicles.
10. To provide a device of relatively simple construction and economical to manufacture.
11. To provide a device which can be readily installed and maintained.

The foregoing and further objects are achieved by this invention, which comprises an elastic member which is secured to a frame member above the trojan bar and depends downwardly therefrom. This elastic member includes means for adjusting its weight carrying capacity. The elastic member is attached to the trojan bar and partially supports the weight of the bar.

More specifically, in a preferred embodiment of the instant invention, first provided is an upper mounting bracket which is affixed to the pre-existing frame. The upper end of an extension coil spring is attached to the upper mounting bracket. The upper end of a link-type chain is attached to the lower end of the spring, and the lower end of the chain is connected to a lower mounting bracket, which is secured to an existing trojan bar.

A further embodiment utilizes a double hook between the lower end of the aforesaid chain and the lower mounting bracket.

Further, and more specific, objects and advantages of the instant invention will become readily apparent to those skilled in the art from the following detailed description of a preferred embodiment, taken in conjunction with the drawings, in which.

Figure 1:
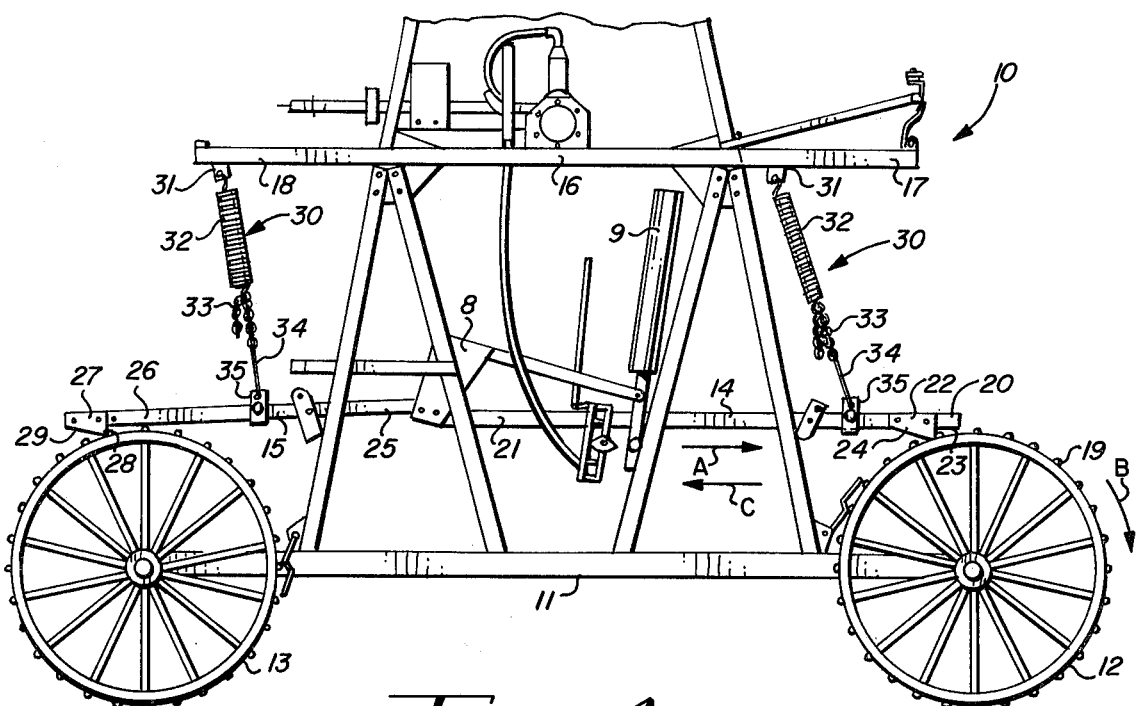
FIG. 1 is a side elevation, partly broken away, illustrating a powered vehicle having the trojan bar suspension device of the instant invention attached thereto.

Referring now to the drawings, wherein like reference characters denote corresponding elements throughout the several views, and first more particularly to FIG. 1, in which a powered vehicle 10 is shown. This vehicle is depicted as being of the general type of irrigation machine driven by a trojan bar, and is used for the purpose of illustration. Other examples of machines utilizing this type of drive mechanism will occur to those skilled in the art.

In FIG. 1, a frame 11 supports a front wheel 12, a rear wheel 13, a front trojan bar 14 and a rear trojan bar 15. The illustration shows both wheels as drive wheels, although it is recognized that vehicles are constructed with a single wheel drive.

The frame 11 has an integral upper frame member 16, having a front end 17 and a rear end 18.

Figure 5:
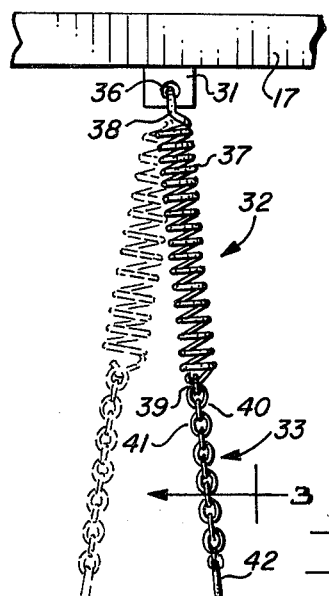
FIG. 5 is an enlarged fragmentary top plan view corresponding to the view of FIG. 4.
Figure 4:
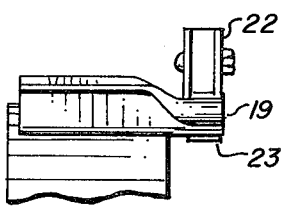
FIG. 4 is an enlarged, fragmentary front elevation, illustrating, in further detail, the trojan bar of FIG. 1, the engagement means and a lug.

The wheels 12 and 13 each support a plurality of lugs 19, as more clearly shown in FIGS. 4 and 5.

The front trojan bar 14 has a front end 20 and a rear end 21. Engagement means 22 are affixed to the front trojan bar 14 proximate front end 20 by conventional methods, such as threaded fasteners, rivets or welding. The engagement means 22 have a drive surface 23 and a sliding surface 24. Drive surface 23 engages a lug 19 during the power stroke of the trojan bar 14 and the sliding surface 24 slides over a lug 19 during the return stroke of the trojan bar.

The rear trojan bar 15 has a front end 25 and a rear end 26. Engagement means 27, generally analogous to engagement means 22, are affixed to the rear trojan bar 15 proximate the rear end 26 by conventional means. Engagement means 27 have a drive surface 28 and a sliding surface 29.

As the working actions of both the front trojan bar 14 and the rear trojan bar 15 are similar, only the functioning of the front trojan bar 14 will be described.

Figure 2:
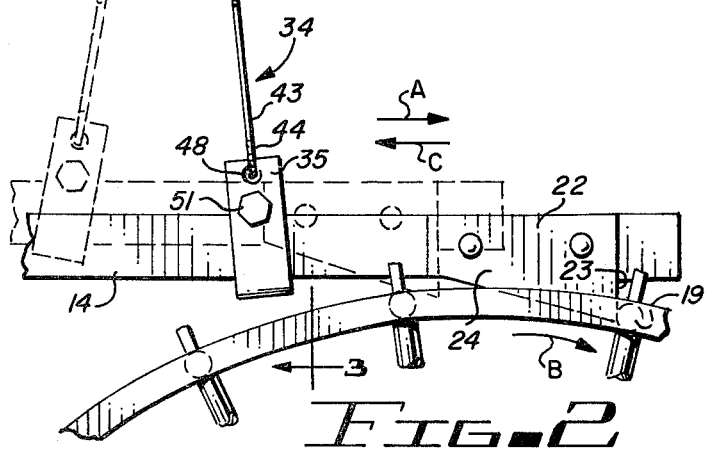
FIG. 2 is an enlarged, fragmentary side elevation, of a portion of FIG. 1, further illustrating the instant invention, an alternate position being shown in broken outline.

Referring now to FIGS. 1 and 2, during a power stroke, the motion is transferred from the power source, shown in the form of a hydraulic cylinder 9, via a lever arm 8 to the front trojan bar 14, moving the trojan bar in the direction of arrowed line A. The drive surface 23 of engagement means 22 pushes against a lug 19 of the front wheel 12, drivably rotating the front wheel 12 in the direction of arrowed line B and moving the vehicle 10 along the ground.

During the return stroke, motion is transferred from the hydraulic cylinder 9 through the lever arm 8 to the front trojan bar 14. The trojan bar is moved in the direction indicated by arrowed line C, while the sliding surface 24 of the engagement means 22 slides over the next rearward lug 19 until the end of the return stroke. During the next power stroke, the lug 19, previously in contact with the sliding surface 24 during the return stroke, is engaged by the drive surface 23.

The solid line in FIG. 2 illustrates the motion of the trojan bar 14 and the invention 30 in the direction of arrowed line A, while the broken outline shows the motion in the direction of arrowed line C.

Those skilled in the art are familiar with the mode of operation of a trojan bar drive mechanism as described above and will readily appreciate the following description of the instant invention.

As illustrated in FIG. 2, the device of the invention, denoted generally 30 as applied to this vehicle, comprises an elastic member having an upper mounting bracket 31, a spring 32, adjusting means in the form of a link chain 33, a double hook 34 and a lower mounting bracket 35. As the application of this invention to the rear trojan bar 15 is similar to that of the front trojan bar 14, only the use of the invention on the front trojan bar 14 will be shown.

The upper mounting bracket 31 is attached by conventional means, such as threaded fasteners, to the front end 17 of the upper frame member 16, and has an aperture 36.

The spring 32 has a plurality of coils 37, an upper hook 38 engaged within the aperture 36 and a lower hook 39.

The link chain 33 has a plurality of links 40 with apertures 41. The lower hook 39 of the spring 32 engages an aperture 41 of a link 40, detachably securing the chain 33 to the spring 32.

The double hook 34 has an upper hooked end 42, a rod 43, and a lower hook end 44. The upper hooked end 42 passes through an aperture 41 of a link 40 of the chain 33, securing the hook 34 to the chain 33.

Figure 3:
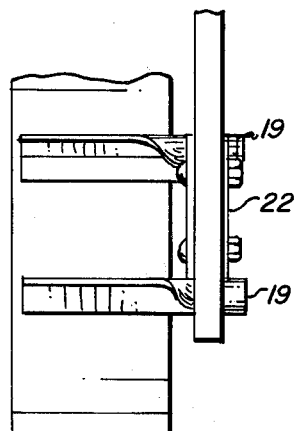
FIG. 3 is an enlarged, fragmentary front section view, taken about on the plane of the line 3—3 of FIG. 2, and especially shown a chain, double hook and lower mounting bracket useful in connection with the instant invention.

As shown more clearly in FIG. 3, the lower mounting bracket 35 has two spaced legs 45 and 46 and a connecting platform 47. The legs 45 and 46 are spaced to receive the front end 20 of the trojan bar 14, which rests on the platform 47. The leg 45 has an upper aperture 48 and a lower aperture 49 (not illustrated). The leg 46 has an aperture 50 (not illustrated) aligned with the lower aperture 49 of the leg 45. A bolt 51 passes through aligned apertures 49 and 50 and is retained in position by a nut 52. Tightening of the nut 52 on the bolt 51 results in a clamping action of the lower mounting bracket legs 45 and 46 on the trojan bar 14, retaining the lower mounting bracket 35 in position. The lower hooked end 44 of the double hook 34 passes through the upper aperture 48 of the leg 45, retaining the lower mounting bracket 35 to the double hook 34.

The exact relative placement of the upper mounting bracket 31 and the lower mounting bracket 35 on the upper frame member 16 and the trojan bar 14 is determined by the design of the particular frame 11, with due consideration given to the length of the power and return strokes of the trojan bar, the effective working length of the elastic member employed and other design perameters discernable by those skilled in the art.

During operation, the primary concern is the return stroke of the trojan bar 14, as the power stroke is substantially unaffected. The frictional engagement between the drive surface 23 and a lug 19, resulting from the force imparted to the trojan bar by the lever arm 8, easily extends the spring 32 at the end of the power stroke.

As previously noted, during the return stroke, sliding surface 24 and a lug 19 are in contact. As the full weight of the trojan bar 14 is carried by a lug 19 and the lever arm 8, both the sliding surface 24 and a lug 19 are subject to substantial wear.

The spring 32 is of a length and strength capable of partially supporting the weight of the trojan bar. Adjustment of the effective length of the link chain 33 selectively regulates the amount of the weight of the trojan bar 14 supported by the spring 32 and determines the working height of the trojan bar 14. Alternate means are provided for accomplishing this adjustment. One requires selecting the appropriate link 40 of the chain 33 and engaging the lower hook 39 of the spring 32 within the aperture 41 of the selected link 40. Another requires selecting the appropriate link 40 and engaging the upper hooked end 42 of the double hook 34 within the aperture 41 of the selected link 40.

The working height of the trojan bar 14 is adjusted for maximum contact between the drive surface 23 a lug 19 during the power stroke of the trojan bar 14, and for minimal contact between the sliding surface 24 and a lug 19 during the return stroke of the trojan bar 14. As the spring 32 is adjusted to carry a substantial portion of the weight of the trojan bar 14, the wear of the sliding surface 24 and a lug 19 is considerably diminished.

Those skilled in the art will easily discern alternate embodiments other than those shown herein for the purposes of illustration.

As as has been demonstrated, the invention 30 provides means for reducing the wear on the sliding surface 24 and a lug 19 by supporting a substantial portion of the weight of the trojan bar 14 with an elastic member in the form of a spring 32. The service life of the vehicle 10 is extended as the required maintenance is decreased. The means of attachment to the upper frame member 16 and the trojan bar 14 and selective adjustment provided by the link chain 33 make the invention 30 readily adaptable to pre-existing machines. Likewise, the installation of the invention 30 on these extant machines and the required maintenance do not demand special tools, equipment or training. The invention 30 is of a design of simple means readily and economically manufactured.

I claim:

1. In a powered vehicle including:
   a frame;
   a wheel rotatably carried by the frame, for supporting said frame above the ground;
   a plurality of radially spaced lugs carried by said wheel;
   a substantially horizontal trojan bar, having first and second ends, carried by said frame;
   drive means for imparting reciprocal motion to said trojan bar;
   engagement means proximate one end of said trojan bar for sequentially engaging said lugs and urging rotation of said wheel in response to the reciprocal motion of said trojan bar;
   said improvements comprising an elastic member under constant tension having an upper end attached to said frame at a position spaced above said trojan bar and a lower end attached to said trojan bar intermediate said ends, wherein said elastic member partially supports the weight of said trojan bar.

2. The improvements of claim 1, wherein said elastic member includes an elongate spring.

3. The improvements of claim 2, wherein said elongate spring is an extension coil spring.

4. The improvements of claim 1, further including adjusting means for selectively regulating the support of said trojan bar by said elastic member.

5. The improvements of claim 4, wherein said adjusting means includes an elongate member having a plurality of attachment means spaced therealong for detachable securment to said elastic member and to said trojan bar.

6. The improvements of claim 4, wherein said adjusting means includes an elongate member having a plurality of attachment means spaced therealong for detachable securment to said elastic member and to said frame.

7. The improvements of claim 5 or claim 6, wherein said elongate member includes a link chain.

* * * * *